Jan. 10, 1961 W. F. HUCK ET AL 2,967,708
PIN HANDLING MECHANISM
Filed Sept. 16, 1955 6 Sheets-Sheet 1

Fig. 1.

INVENTORS.
William F. Huck
Alexander J. Albrecht

United States Patent Office 2,967,708
Patented Jan. 10, 1961

2,967,708

PIN HANDLING MECHANISM

William F. Huck, Forest Hills, N.Y., and Alexander J. Albrecht, Teaneck, N.J., assignors, by mesne assignments, to The Brunswick Automatic Pinsetter Corporation, Paramus, N.J., a corporation of Delaware Filed Sept. 16, 1955, Ser. No. 534,726

16 Claims. (Cl. 273—43)

This invention relates to pin handling mechanisms for use with a bowling alley and more particularly to pin handling mechanisms for use with an automatic pinsetter.

It is a general object of the invention to provide new and improved pin handling mechanisms of the character described.

A more specific object of the invention is to provide a pin handling mechanism for use with an automatic pinsetter on a bowling alley including a pin elevating member movable in a continuous path having an upwardly extending portion to elevate pins from a pickup position adjacent the floor of the alley pit to an elevated discharge position, and a pin tray for receiving pins from the elevating member, the pin tray being movable to a first position in which pins are directed forwardly of the pin elevating member for reuse and a second position in which the pins are directed rearwardly of the pin elevating member for transfer out of use.

It is also an object of the invention to provide a pin handling mechanism of the character described including a rotatable, ring-shaped pin elevating member having means on its inner periphery to elevate pins from a position adjacent the floor of the alley pit to an elevated discharge position and a pin receiving tray having a part thereof mounted within the periphery of the pin elevating member beneath its upper extremity at the pin discharge position, means mounting the pin receiving tray for pivotal movement between a forwardly and downwardly inclined position in which it will direct pins forwardly of the pin elevating member for reuse and a rearwardly and downwardly inclined position in which it will direct pins rearwardly of the pin elevating member in case of a jam or when transferring pins out of use, means yieldably maintaining the tray in the forwardly and downwardly inclined position, and means responsive to movement of the tray to the rearwardly and downwardly inclined position to latch the tray in such position.

A further object is to provide a pin conveying means for use with a pinsetter mounted on a bowling alley having a pit at the rear end of the alley provided with means for directing pins to a pickup position, comprising a pin elevating mechanism for raising pins from the pickup position to an elevated discharge position, means for receiving pins from the elevating mechanism and for directing the pins forwardly for reuse including a conveyor, means for continuously driving the conveyor, and pin operated means associated with the discharge end of the conveyor for stopping the progress of pins on the conveyor without stopping the conveyor.

Another object is to provide, in a pinsetter having an indexable pin holding turret supported over the rear end of the alley bed and having a plurality of pockets to receive pins for reuse on the alley, a pin conveying mechanism of the character described in the preceding paragraph wherein the conveyor terminates in a discharge end disposed over the turret so that pins from the conveyor drop into successive pockets on the turret as the turret is indexed, and wherein the means for stopping the progress of pins on the conveyor includes a blocking device normally positioned to permit a pin on the conveyor to pass and movable by a passing pin to a blocking position, and means operable by each of the pins delivered to the turret except the last of a set for releasing the blocking device for return to normal position.

Other objects and advantages will become readily apparent from the following detailed description taken in connection with the accompanying drawings, in which.

While illustrative embodiments of the invention are illustrated in the drawings and will be described in detail herein, the invention is susceptible of embodiment in many different forms, and it is intended that the present disclosure is to be considered as an exemplification of the principles of the invention and is not intended to limit the invention to the embodiment illustrated. The scope of the invention will be pointed out in the appended claims.

Referring now to the drawings, the invention is embodied in an automatic pinsetter, portions of which are shown including a pin receiving and setting deck 10 supported over the rear end of a bowling alley bed 11 and adapted to receive pins delivered thereto from a pit 12 formed at the rear end of the alley bed. In bowling, the pins, as well as the bowling balls, fall from the alley 11 into the pit 12. As disclosed herein, the pit is provided with a vibrating board or shaker tray 15 adapted to receive the pins and balls and to direct them rearwardly of the pit to pickup positions. At the rear of the vibrating board or shaker tray 15, the pins are taken at a pickup position by an elevating mechanism 16 which raises the pins from the pickup position to an elevated discharge position. At the discharge position the pins are delivered from the elevating mechanism to a pin receiving tray 17 adapted to direct the pins forwardly to a cross conveyer mechanism 18. The conveyor mechanism 18 delivers the pins to a turret 13 having pockets adapted to receive individual pins and to drop a set of pins into buckets 14 forming a part of the pinsetting deck 10. The deck 10 is adapted to be moved from an upper position shown in full lines in Figure 1 wherein it receives the pins from the turret 13 to a lower position shown in broken lines in Figure 1 wherein it sets the pins on the alley 11 for reuse.

Figure 3:
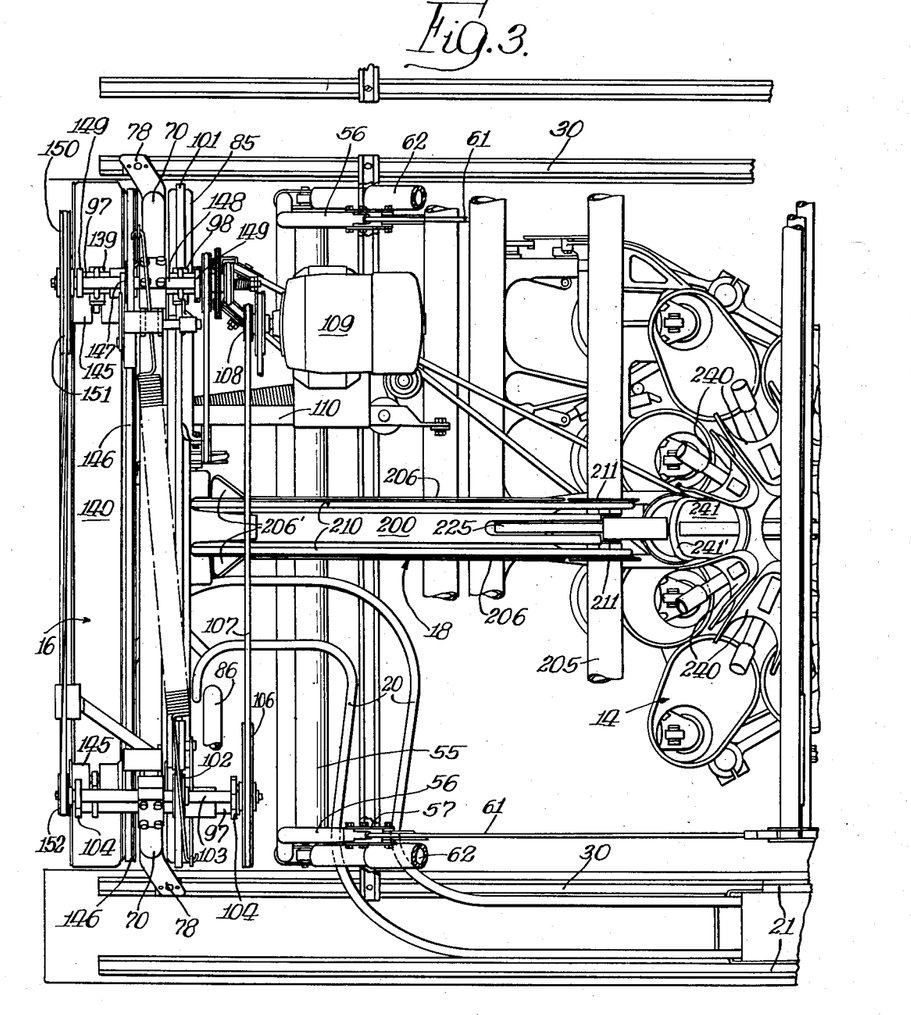
Figure 3 is a top plan view of the mechanisms shown in Figure 1.

At the rear of the vibrating board or shaker tray 15, the balls are taken by a ball elevating mechanism 19 which raises the balls to an elevated discharge position. At the ball discharge position, the balls are delivered from the elevating mechanism to transfer tracks 20 (Fig. 3) which direct the ball to ball return tracks 21 by which the balls are returned for reuse by a bowler.

Figure 1:
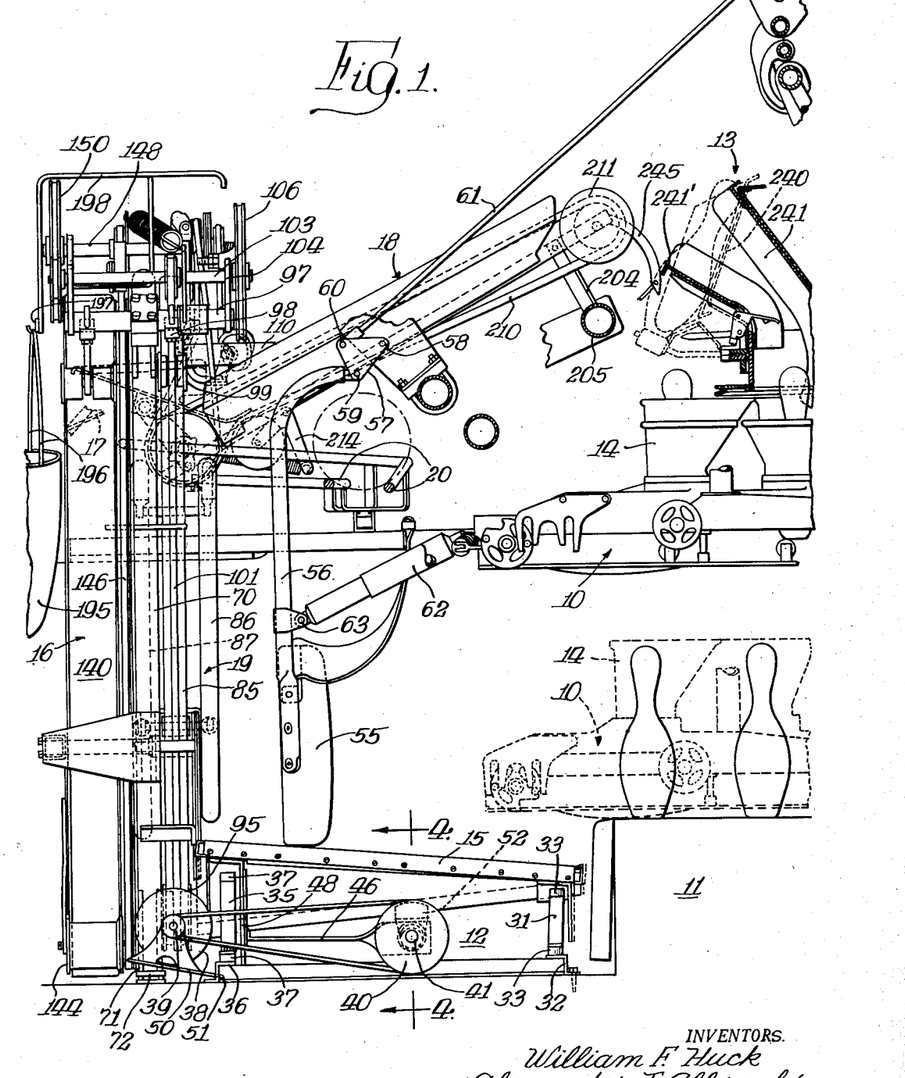
Figure 1 is a side elevation of a portion of an automatic pinsetter including ball and pin handling mechanisms embodying the present invention, with the drive motor therefor being omitted.
Figure 4:
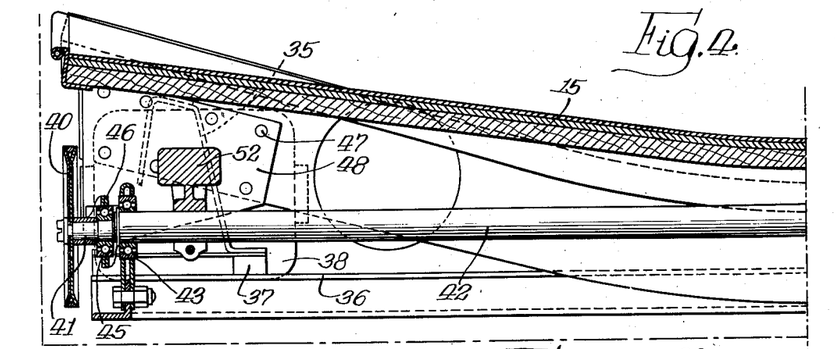
Figure 4 is an enlarged sectional view, taken on the line 4—4 of Figure 1, showing one-half the width of the shaker tray, the other half having a similar, complementary shape.

Referring to Figs. 1 and 4 for a more detailed description, the shaker tray 15 extends rearwardly from a position adjacent the end of the alley bed 11 to a position adjacent the ball and pin elevating mechanisms and extends transversely for substantially the entire distance between the side walls 30 (Figs. 2 and 3) of the alley pit. The shaker tray or vibrating board 15 is curved transversely to present a concave upper surface having its lowest portion adjacent the middle of the board and sloping downwardly from front to rear so that the natural tendency of the board is to direct the pins and balls rearwardly of the board. To assist in directing the pins and balls rearwardly, the shaker tray is mounted resiliently for vibratory movement rearwardly and forwardly, and means is provided for transmitting a vibrating motion to the tray including the movement described above.

The tray 15 is supported at its forward end adjacent the rear of the alley 11 by means of a pair of brackets 31, one positioned at each side of the tray, each of the brackets being resiliently connected to the shaker tray and to a supporting angle iron 32 by means of resilient mounting blocks 33. At the rear end of the shaker tray, it is supported by means of brackets 35, one positioned at each side of the tray, and each being resiliently connected to the tray and to a supporting angle iron 36 by means of resilient mounting blocks 37. The resilient mounting blocks 33 and 37 permit the desired vibratory motion of the tray described above relative to the supporting angle irons 32 and 36.

Vibratory motion is transmitted to the shaker tray 15 by means of a motor 38 having a belt and pulley connection 39 to a pulley 40 mounted on the eccentric end portion 41 of a shaft 42 mounted in stationary bearings 43 at opposite sides under the shaker tray. While only one end of the shaft 42 is seen in Fig. 4, the shaft is provided at each end with an eccentric end portion 41. Each of the eccentric end portions 41 is provided with a suitable roller bearing 45 by means of which a strap 46 of suitable metal is mounted for connection to actuate the shaker tray 15. Each of the straps 46 extends rearwardly of the shaker tray from the shaft 42 and each is suitably connected to a bracket 48 depending from the underside of the shaker tray. Thus, it will be seen that on driving the motor 38 motion is transmitted through the belt and pulleys 39 and 40 to the shaft 42, and on rotation of the shaft 42 the end portions 41 move eccentrically about the axis of the shaft 42 so that a back and forth vibratory motion is transmitted through the straps 46 to the tray 15, causing it to move forwardly and rearwardly. The up and down components of movement of the eccentric result in only flexing the strap 46. Vibratory motion of the tray cooperates with its shaping to direct the balls and pins toward the center of the tray and rearwardly to pickup positions. The pulley 40 is mounted eccentrically on the shaft portion 41 so that the axis of the pulley coincides with the axis of the shaft 42 and the motion of the outer periphery of the pulley is concentric with the axis of shaft 42. The motor 38 is carried on a supporting bracket 50 which is pivotally counted at 51 so that the weight of the motor maintains the drive belt tight on its pulleys.

Adjacent each end of the shaft 42, a counterweight 52 is secured to the shaft, in line with the eccentric end portions 41, but at positions diametrically opposite the eccentric portions. The eccentric end portions 41 of the shaft create a condition of unbalance wherein the center of gravity for the rotating shaft 42 is eccentric of its axis. The counterbalance weights 52 are provided at positions diametrically opposite the eccentric portions 41 to offset this unbalance and to balance the shaft.

Adjacent the rear of the alley pit, the pinsetter includes a pit cushion 55 (Figs. 1 and 3) which is supported by vertically extending members 56, one at each side of the pit, which support the pit cushion for a limited pivotal movement, as well as for movement vertically. The pit cushion 55 normally hangs to a level above the shaker tray 15 which is insufficient to permit the passage of bowling balls thereunder. Thus, each of the balls rolled down the alley strikes the pit cushion, imparting a limited movement to the pit cushion and the members 56 sufficient to actuate means not shown which initiate succeeding operations in the pinsetter, including the raising of the pit cushion 55 to permit the ball to pass thereunder to the ball elevating mechanism disposed rearwardly thereof. The pit cushion 55 is raised to permit the ball to pass by means of a linkage system provided at each side of the pit. Each linkage system includes a triangular shaped link 57 having a stationary pivotal mounting at 58, a pivotal connection at 59 to one of the members 56, and a pivotal connection at 60 to an actuating link 61. Shock absorber means are provided at each side of the pit cushion to damp the blow of the ball against the pit cushion. Each of the shock absorber means includes a dash-pot 62 having a pivotal connection 63 to one of the members 56 and at the other end a pivotal connection to a stationary part of the framework. It will be seen that when motion is imparted to the links 61 in an upward direction, this motion will be transmitted through the links 57 to the supporting members 56 so that the latter are raised in a path guided by the dash-pots 62, to elevate the pit cushion to a position which permits the ball to roll past.

Referring to Figs. 1, 2, 3 and 5, the ball and pin elevating mechanisms are supported by means of a framework adjacent the rear of the alley pit including a circular frame member 70 conforming generally to the configuration of ball and pin elevating rings to be described. Near the lower extremity of the circular frame member 70, it is provided with supporting legs 71 adjacent opposite sides of the pit, the legs 71 being welded or otherwise secured to the frame member 70 and each including a flat base portion 72 adapted to rest on the floor of the alley pit and to be secured thereto by suitable means such as screws. The circular frame member 70 is additionally supported at opposite sides of the pit at positions approximately midway its height by means of brackets 78 welded or otherwise secured to the ring and extending outwardly therefrom to be supported on and suitably secured to side walls 30 of the alley pit.

The ball elevating mechanism 19 includes a rotatable ball elevating ring 85 disposed forwardly of the frame member 70 and ball track members 86 and 87 arranged with respect to the ball elevating ring so that rotation of the ring will roll a ball up the track members from the ball pickup position adjacent the rear of the alley pit to an elevated discharge position. The ball elevating ring 85 is comprised of a circular metallic member 89 having a generally U-shaped cross-section (Fig. 5) filled with a body of resilient, frictional material 90, such as rubber, so that on rotation of the ring the material 90 frictionally engages a ball and is effective to roll the ball up the track members 86 and 87.

The ball elevating ring 85 is supported and guided at the bottom by means of flanged guide rollers 95 rotatably mounted on the front side of the supporting legs 71 for the circular frame member 70. Near the top of the circular frame member 70, adjacent opposite sides of the pit, the frame member is provided with radially outwardly extending brackets 96, each of which rigidly carries a mounting bar or shaft 97 extending in a front to rear direction. Forwardly of the circular frame member 70, each of the mounting bars 97 carries a rigidly mounted yoke 98 (Figs. 1 and 3) and each of the yokes 98 carries a flanged roller 99 which guides the ball elevating ring 85 at the top. The rollers 95 and 99 support the ball elevating ring in a position closely adjacent the rear of the shaker tray 15 with the lower extremity of the inner periphery of the ring in line with and slightly below the center of the shaker tray at the ball pickup position.

Figures 2, 2A:
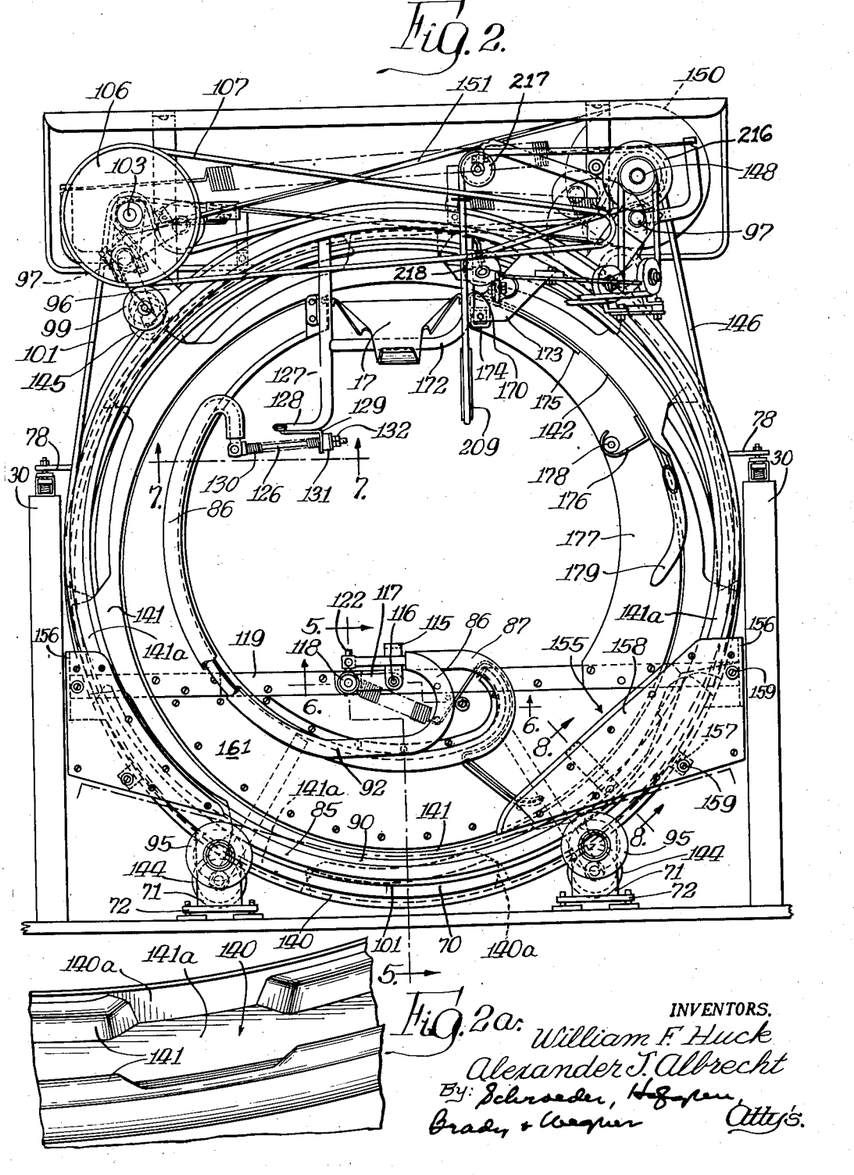
Figure 2 is a front elevation of the ball and pin elevating mechanisms illustrated in Figure 1.
Figure 2a is an enlarged, fragmentary perspective view showing a pin pocket formed on the internal periphery of the pin elevating ring.

The ball elevating ring 85 is rotated in a clockwise direction as seen in Fig. 2 by means of a belt 101 extending around a substantial portion of its outer periphery and trained over a pulley 102 (Fig. 3) mounted on a drive shaft 103 supported above the mounting bar 97 by means of brackets 104 secured to the mounting bar 97. The drive shaft 103 is driven from a large pulley 106 attached to the forward end thereof and having a belt 107 trained thereabout and around a pulley 108 driven from a motor 109. The motor 109 is supported by means of a rod 110 projecting forwardly from the frame member 70. Each of the rollers 95 and the roller 99 at the upper right of Fig. 2 which support and guide the ball elevating ring 85 are provided with central grooved portions which are adapted to receive and guide the driving belt 101 to maintain it on the periphery of the ball elevating ring 85. The motor 109 is driven continuously during operation of the pinsetter, so that the ball elevating mechanism is at all times adapted to raise a bowling ball from the pickup position to the elevated discharge position.

The track members 86 and 87 are arcuately curved to conform to the circular configuration of the ball elevating ring and are spaced inwardly of the ring by a distance slightly less than the diameter of the bowling ball. The track 86 is disposed somewhat forwardly of the ball elevating ring 85 and the track 87 is disposed rearwardly of the ball elevating ring, so that the track members provide, with the elevating ring, a three point contact with a bowling ball sufficient to guide and elevate the ball rotation of the ring. Each of the track members 86 and 87 is surfaced with a resilient gripping material seen at 91. The lower ends of the track members 86 and 87 are disposed substantially over the lower extremity of the ball elevating ring 85 at the ball pickup position, and the track members extend therefrom to an elevated discharge position. The forwardly disposed track member 86, adjacent its lower end portion, is bent upwardly at 92 (Fig. 2) above the level of the rearwardly disposed track member 87 and out of the arcuate configuration conforming to the shape of the elevating ring so as to permit the entrance of a ball between the ring and the track members for elevation thereby.

The ball track members 86 and 87 are connected together to form a unitary, rigid structure which is mounted for generally vertical movement to permit the entry of a bowling ball between the ring 85 and the tracks. The rigid track structure is also pivotally mounted adjacent the lower ends and the upper ends are biased outwardly toward the ball elevating ring so as to permit movement of the track structure relative to the ring to yieldably hold a ball in engagement with the ring.

Figures 5, 6, 7, 8:
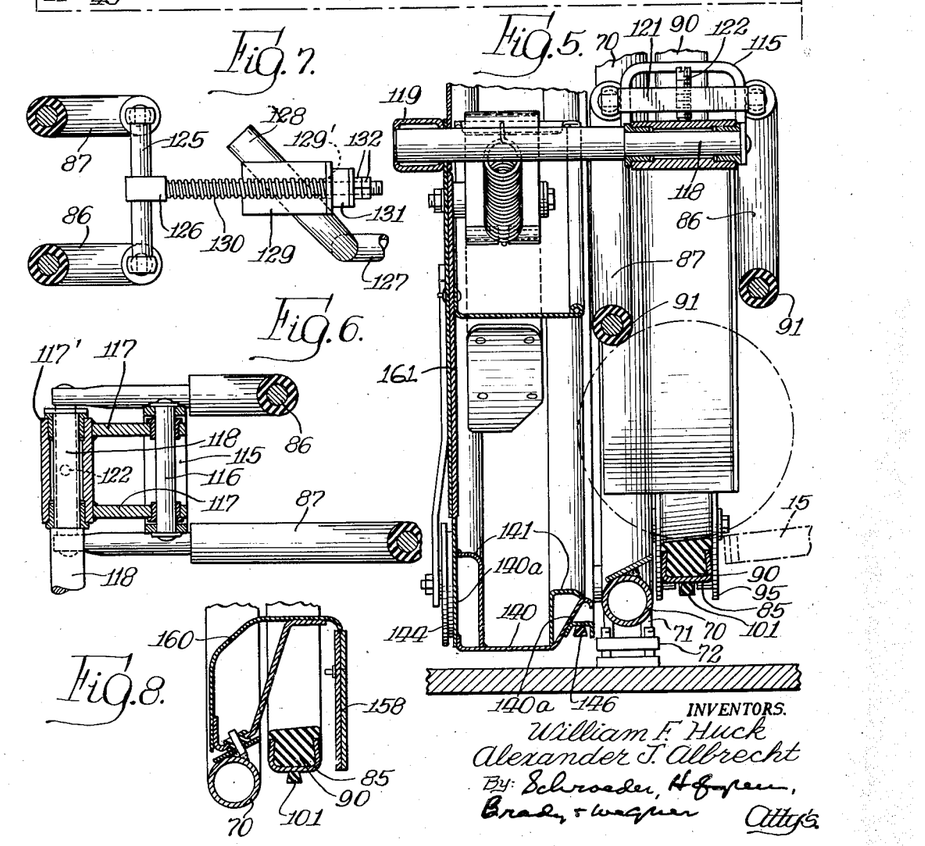
Figure 5 is an enlarged sectional view, taken on the line 5—5 of Figure 2, showing the lower portion of the ball and pin elevating mechanisms.
Figure 6 is an enlarged, fragmentary sectional view, taken on the line 6—6 of Figure 2, showing the mounting of the ball tracks at the lower ends.
Figure 7 is an enlarged, fragmentary sectional view, taken on the line 7—7 of Figure 2, showing the mounting of the ball tracks at the upper ends.
Figure 8 is an enlarged, fragmentary sectional view, taken on the line 8—8 of Figure 2.

Referring now to Figures 2 and 5, adjacent the lower upturned ends of the track members 86 and 87, they are rigidly secured together by means of an inverted U-shaped bracket 115 which is welded or otherwise secured to each of the track members. The lower ends of the arms formed by the U-shaped bracket 115 afford a mounting support for a pivot pin 116 which carries adjacent its opposite ends links 117 which are secured to a hub 117' pivotally mounted on a rod 118 which extends forwardly from a cross bar 119 forming a part of the framework secured to the circular frame member 70. The ends of the track members 86 and 87 extend beyond the U-shaped bracket 115 and at the ends carry respectively opposite ends of a bar 121 having an adjustable stop screw 122 which rests on the hub 117'.

It will be seen that the mounting structure just described permits movement of the lower ends of the track in a generally vertical direction with the links 117 moving about the pivot axis 118 so that the lower ends of the track may move vertically upward to permit the entrance of a ball between the ring 85 and the track members. Engagement of the stop screw 122 with the hub 117' limits downward movement of the track members to positions which may be adjusted to account for wear of the ball elevating ring and the ball tracks. It will be seen also that the lower ends of the tracks are pivotally mounted so that the upper ends of the tracks may move about the pivotal mounting 118 to yieldably hold a ball in engagement with the ring 85.

At the upper ends, the track members 86 and 87 are rigidly connected by a bar 125 (Figs. 2 and 7). Adjacent a midportion of the bar 125, it carries a pivotally mounted link 126 which extends generally horizontally away from the track members 86 and 87. The circular frame member 70 is provided with a downwardly extending support member 127 welded or otherwise secured to the frame member 70 and having a lower end portion 128 to which a supporting bracket 129 is secured. The bracket 129 is provided with an aperture 129' which loosely receives the end of the link 126. A spring 130 surrounding the link 126 bears at one end against the bracket 129 and at the other end against an enlarged end portion on the link 126. On the opposite side of the bracket 129 from the spring 130, the link 126 is provided with a resilient washer 131 and adjustable nuts 132 which limit movement of the track members toward the ball elevating ring 85.

It will be seen that the mounting structure just described for the upper end portions of the tracks 86 and 87 permits movement of the track members generally radially inwardly of the ball elevating ring 85 about the pivotal mounting at the lower ends of the tracks against the urge of the spring 130 so that the track members yieldably maintain a ball in engagement with the ring 85 for elevation thereby. It will also be seen that the mounting of the link 126 loosely in the bracket 129 permits a universal movement of the link 126 relative to the bracket 129 so as to permit generally vertical movement of the track members when a ball enters between the ring 85 and the track members.

Referring to Figs. 2, 2a and 5, the pin elevating mechanism 16 includes a rotatable pin elevating ring 140 having radially inwardly turned flanges 140a and pocket forming members 141 defining evenly spaced pin receiving pockets 141a formed on the internal periphery of the ring for elevating pins from a pickup position adjacent the rear of the alley to an elevated discharge position. The pockets 141a are each adapted to receive the belly of a pin with either the base or the head end leading. The elevating mechanism 16 also includes a pin guiding and holding structure 142 (Fig. 2) adapted to retain the pins in the pockets when they reach a position in which their natural tendency is to fall out of the pockets by gravity.

The pin elevating ring 140 is disposed rearwardly of the circular frame member 70 and is supported near the lower extremity by means of flanged guide rollers 144 which are mounted on the supporting legs 71 for the frame member 70. The guide rollers 144 for the pin elevating ring are mounted somewhat lower than the guide rollers 95 for the ball elevating ring so that the pin elevating ring is mounted slightly lower than and eccentric to the ball elevating ring 85 with the lower extremity at the pin pickup position being disposed rearwardly of the ball pickup position. The pin elevating ring 140 is guided near its upper extremity by means of flanged guide rollers 145 (Figs. 2 and 3) which are mounted on yokes 139 (Fig. 3) depending from the mounting bars 97 which extend in a front to rear direction on the brackets 96 of circular frame member 70. The pin elevating ring 140 is driven in a counter-clockwise direction, as viewed in Figure 2, by means of a drive belt 146 extending around a substantial portion of the periphery of the ring at the forward edge thereof, trained about a drive pulley 147 (Fig. 3) mounted on a drive shaft 148 supported by brackets 149 secured to the mounting bar 97 seen at the right hand side of Figure 2. The drive shaft 148 is driven by means of a large pulley 150 having a belt 151 trained thereabout and over a smaller pulley 152 secured on the drive shaft 103 for the ball elevating mechanism. Thus, the pin elevating ring is continuously driven during operation of the pinsetter to continuously elevate pins directed to the pickup position by the shaker tray 15 provided in the pit.

The pin elevating mechanism includes a pin guiding structure 155 adjacent the lower extremity of the pin elevating ring near the pickup position and to the right thereof, as viewed in Figure 2. The circular frame member 70 is provided with guide brackets 156 at opposite sides of the pit at about the level of the lower portion of the ball tracks. The guide brackets 156 are welded or otherwise secured to the ring 70 and extend rearwardly therefrom to positions in which they are connected by the cross bar 119 previously referred to. The bracket 156, seen at the right of Figure 2, and an additional lower mounting bracket 157 form supporting means to which a generally triangularly shaped plate 158 is attached as by screws 159. The triangular plate 158 forms a portion of a guard or guide 160 (Figure 8) which overlies a portion of the length of the ball elevating ring 85 and extends downwardly for attachment to the circular frame member 70 slightly forwardly of the path of the pin elevating ring 140. The above described guide structure functions to assist in properly locating pins previously taken by the pin elevating ring at the pickup position. Occasionally, pins reaching the pin elevating ring are only partly or improperly located within the pockets 141a provided in the pin elevating ring so as to be insecurely seated for elevation by the ring. The guide 160 functions to direct pins rearwardly and to readjust the pins to proper positions within the pockets whenever necessary. A guard 161 (Fig. 5) supported by the cross bar 119 extends downwardly therefrom and across the area to the rear of the pin elevating ring to prevent pins from falling through the pin elevating ring to the rear.

When the pins are properly seated in the pin receiving pockets 141a in the ball elevating ring, they would be elevated by the ring and retain their positions in the ring until such time as the pocket reaches a position above the axis of rotation for the ball elevating ring when their normal tendency would be to fall from the pocket by reason of the action of gravity. The pin guiding member 142, previously referred to, is provided for cooperation with the ball elevating ring to retain the pins in the pockets 141a until such time as they reach the elevated discharge position at which time it is desirable that the pins fall from the pockets. The means for supporting the pin guiding member 142 includes the circular frame member 70 from which there depends at the top of the member 70 a downwardly extending structural member 170 (Fig. 2) having a vertical leg welded or otherwise secured to the frame member 70, and a horizontally extending leg 172, welded or otherwise secured to the previously described structural member 127. The frame member 70 is also provided with a flat bracket 173 secured thereto and extending downwardly to a position where it is attached to the vertical leg 171 of the structural member 170. The bracket 173 has secured thereto a hollow, rectangular frame member 174 extending rearwardly from the bracket. The frame member 174 forms a support to which the pin guiding member 142 is attached. The member 142 is preferably comprised of sheet metal and is provided with an underlying spring metal strip 175 on which the member 142 is superposed. At the upper ends, the members 142 and 175 are provided with an angularly bent, vertically downwardly extending, terminal portion which is secured to the frame member 174. The spring metal strip 175 is sprung so that its tendency is to bias the lower extremity of the pin guiding member 142 radially outward toward the pin elevating member 140. Near its lower extremity the pin guiding member 142 is provided with a hook portion 176 adapted to latch over a pin 178 which limits the movement of the lower end of the member 142 toward the pin elevating ring 140. The latch pin 178 is mounted on a curved guard member 177 which is supported on the cross bar 119 and extends upwardly alongside the path of the pin elevating ring to prevent pins from falling rearwardly through the pin elevating ring. The hook 176 permits movement of the lower end portion of the guiding member 142 radially inwardly of the pin elevating ring when the member 142 is engaged by pins in the pin receiving pockets 141a. Such inward movement of the lower end of the member 142 occurs against the bias of the spring metal strip 175 so that the member 142 functions to retain the pins in the pockets 141a. At its lower extremity the pin guiding member 142 is formed with a wiper portion 179 which functions to cause gradual engagement of a pin with the member 142 without the pin catching on the member 142 so as to be dislodged from a pocket 141a.

Figures 9, 9A, 10:
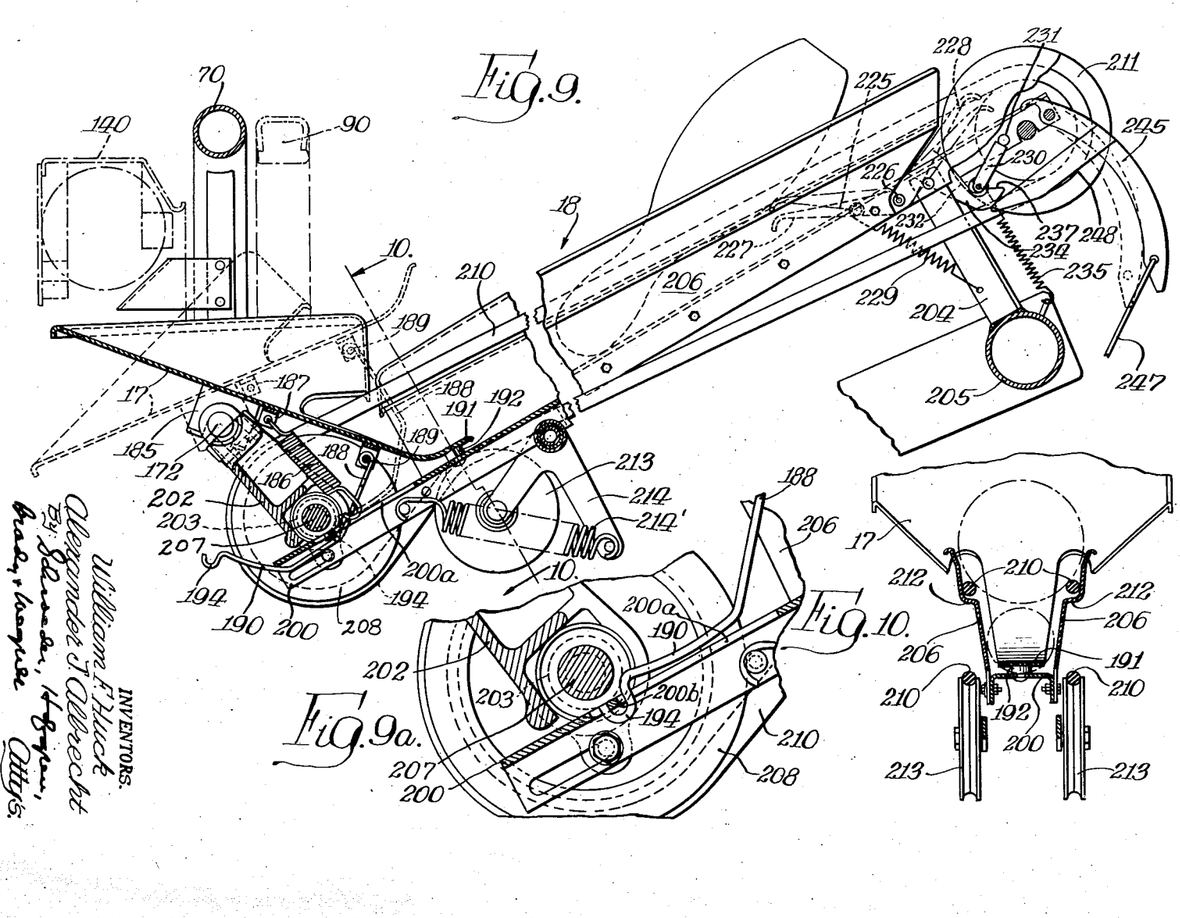
Figure 9 is an enlarged, fragmentary elevational view, partly in section, showing the pin receiving tray, the cross conveyor mechanism, and the blocking device associated with the cross conveyor.
Figure 9a is an enlarged, fragmentary view similar to Figure 9, showing details of the latching mechanism associated with the pin receiving tray, with the tray in the rearwardly and downwardly inclined position.
Figure 10 is a sectional view, taken at about the line 10—10 of Figure 9.

The pin elevating mechanism 16 raises the pins from the pickup position to the elevated discharge position where the pins are permitted to fall from the pockets 141a to the pin receiving tray 17, previously referred to, which underlies the pin elevating ring adjacent the terminal portion of the pin guide 142 at the pin discharge position. Referring to Fig. 9, the pin receiving tray is pivotally mounted for movement between a forwardly and downwardly inclined position in which the tray directs pins forwardly toward the cross conveyor 18 for reuse in the pinsetter and a rearwardly and downwardly inclined position wherein the tray will direct the pins rearwardly of the pin elevating ring.

The pin receiving tray 17 is so formed that regardless of whether it receives a pin from the pin elevating mechanism with the head of the pin leading or the base of the pin leading, the tray is effective to direct the pin toward the cross conveyor 18 with the base of the pin leading and with the head trailing.

By way of explanation, the pockets 141a in the pin elevating ring 140 are adapted to receive pins at the pickup position with either the base or head end of the pin leading, as described previously. As the pin elevating ring rotates in a counterclockwise direction, as viewed in Fig. 2, the pins are held in the pockets by the wiper or pin guiding member 142 until such time as each pin reaches the pin discharge position over the tray 17. The wiper 142 engages primarily the belly of the pin, and if the base of the pin is leading, the belly of the pin is freed when it passes the end of the wiper which terminates at 174, and drops into the pin tray with the head trailing. The center of gravity of the pin is located nearer the base than the head end, and the weight of the pin dropped causes the pin to immediately start sliding downwardly in the tray with the base, which fell first, leading. If a pin is elevated in the ring 140 with the head end leading, the head end of the pin continues to move past the first edge of the tray until such time as the base is released by the wiper. When the wiper finally frees the base, the head of the pin is somewhat beyond the far edge of the tray and the weight of the pin adjacent the base causes the base to slide down the tray first, while the head is somewhat deterred by its encounter with the far edge of the tray.

The pin receiving tray 17 is adapted to function as an automatic safety device for transferring a pin out of use in the event that a pin is delivered to the tray at a time when the tray is filled so that passage of the delivered pin is blocked. The tray is also adapted to function as an automatic transfer out device for transferring pins out of use when, for example, it is desired to replace the entire group of pins being used in the pinsetter.

Referring now to Fig. 9, the tray 17 carries on its underside downwardly extending brackets 185 which are pivotally mounted on the horizontally extending leg 172 of the structural member 170 secured to the circular frame member 70. The tray 17 is biased to the forwardly and downwardly inclined position by means of a spring 186 having its rear end anchored on a bracket 187 secured to the underside of the tray at a position forwardly of the pivot axis 172. The spring 186 has its other end connected to a lever 188 pivotally mounted on the underside of the tray at 189 forwardly of the bracket 187. The lever 188 extends downwardly from the tray through an opening 200a in an elongated frame member 200 having an inverted channel shaped cross-section forming a part of the cross conveyor 18. An upwardly turned end portion 190 of the lever 188 bears against the end of the frame member 200 so that the force of the spring 186 is effective to bias the tray toward the forwardly and downwardly inclined position. At the forward extremity of the tray 17, it is provided with an upwardly turned terminal portion 191 adapted to engage a cooperating resilient stop member 192 provided on the frame member 200 to determine the limit to which the tray may be moved. The tray may be pivotally moved to its rearwardly and downwardly inclined position through the action of a blocked pin as previously described, or the tray may be manually moved to its rearwardly and downwardly inclined position. Movement from the forwardly inclined position to the rearwardly inclined position against the bias of the spring 186 effects movement of the bent portion 190 of the lever 188 along the surface of the conveyor frame 200 to a position in which a hook-like latch portion 194 on the end of the lever is adapted to engage a latch part 200b (Fig. 9a) formed on the conveyor frame 200. In this position of the tray, the force of the spring 186 is sufficient to maintain the latching portion 194 in engagement with the latch part 200b so that the tray is held in the rearwardly inclined position.

Thus, it will be seen that the tray may function as an automatic safety device to transfer a blocked pin rearwardly of the pin elevating member whenever its passage forwardly is blocked. By way of explanation, a number of pin conditions or arrangements of pins could cause the tray to tilt rearwardly to the broken line position and it would be impractical if not impossible to describe each of these conditions specifically. Generally, it is a crowding or jamming of a number of pins on the tray at one time, impeding the free passage of pins, which causes the tilting. For example, the condition may occur where a first delivered pin drops late into the tray because, for example, it becomes partially stuck in the ring 140, and fails to pass from the tray by the time a succeeding pin reaches the tray. The clearance between a pin in the ring 140 and the tray 17 is not great when the tray is in the full line position as seen in Fig. 9. Thus, if the succeeding pin reaches the tray before the preceding pin moves out, and the succeeding pin engages the preceding pin and is unable to drop from the ring 140, the camming action of the pin ring, through the two pins, may cause the tray to tilt rearwardly. The presence of a blocked pin on the conveyor 18 alone will not cause the tray to tilt, but if the passage of pins is blocked on the conveyor so that the pins back-up as far rearwardly as the tray, a jam may occur at the tray as described above. When the tray is deflected to the rearwardly inclined position, it remains in this position, and thus continues to deflect pins rearwardly until the tray is manually reset to the forwardly and downwardly inclined position. Also, if it becomes desirable to transfer all the pins in the machine rearwardly out of use, the tray may be manually moved to the rearwardly inclined position where it is held by the latch portion 194.

If it is found desirable, the latching mechanism disclosed for holding the tray in the rearwardly inclined position may be dispensed with, and means provided merely to bias the tray to the forwardly and downwardly inclined position. With such an arrangement, the tray would still be deflected to the rearwardly and downwardly inclined position by a blocked pin so that the tray will function as an automatic safety device. Also, the tray might be held in the rearwardly inclined position for an extended period of time to transfer pins out of use whenever desirable.

Means may be provided for receiving pins directed rearwardly by the pin tray 17. Such means may comprise a container 195, a portion of which appears in Fig. 1, which may be suspended by elongated supporting members 196 supported on hooks 197 secured to a cover member 198 forming a guard over the top of the ball and pin elevating mechanism.

Referring to Figs. 9 and 10, the cross conveyor 18, which receives the pins from the tray 17 for delivery forwardly to the turret 13 for reuse in the pinsetter, includes the elongated frame member 200, previously referred to, of inverted channel shaped cross section. The frame member 200 extends from a position adjacent the pin tray 17 forwardly to the discharge end of the conveyor adjacent the turret 13. Adjacent the rear end of the frame member 200, it has connected thereto the lower end of a yoke 202 carrying a bearing 203 to support conveyor pulleys, the upper end portion of the yoke being mounted on the horizontally extending leg 172 of the structural member 170, so that the rear end of the frame member 200 is suspended from the structural member 170. Adjacent the forward end of the frame member 200, it is secured to an upright supporting member 204 welded or otherwise secured to a supporting bar 205 extending transversely of the alley and the pit at an elevated position over the pinsetting deck 10, and forming a part of the stationary framework.

The cross conveyor 18 includes a conveyor trough having its bottom formed by the web of the channel shaped frame member 200 and having its sides formed by wall members 206, one attached to each side of the frame member 200 and extending longitudinally of the frame member 200 for almost its entire length. The side wall members 206 are each fashioned at the entrance end of the conveyor with an outwardly bent tip 206' (Fig. 3) which provides a flared entrance to the conveyor trough. Each of the side walls 206 is also formed with a ledge 212 at a mid-portion in its height, the ledges extending for the length of the side walls 206 to underlie the upper reaches of conveyor belts 210 to be described.

Adjacent the rear end of the conveyor frame 200, the bearing 203 in yoke 202 supports a drive shaft 207 having a pair of conveyor pulleys 208 secured thereon and adapted to have pin conveyor belts 210 trained thereabout. Belts 210 are trained about the pulleys 208 and complementary pulleys 211 rotatably supported on the forward or discharge end of the conveyor frame 200 with the upper reaches of the belts overlying the ledges 212 respectively. Pins delivered from the tray 17 with their belly portions leading are engaged by the belts 210 so that the belly of a pin is adapted to be supported by the belts 210 to convey the pin forwardly with its head or upper end resting on the bottom of the trough as illustrated in Fig. 10. The belts 210 are each tensioned by a pulley 213 carried on a bell crank 214 pivotally mounted on the frame 200 and biased to tighten the associated belt 210 by means of a spring 214' connected to the crank arm and to the frame.

The drive shaft 207 at the entrance end of the conveyor 18 also carries a drive pulley 209 (Fig. 2) through which power is transmitted to the pulleys 208. Power is transmitted to the drive pulley 209 by means of a belt 215 trained about the pulley 209 and about a drive pulley 216 on the drive shaft 148. The belt 215 is guided between the pulleys 209 and 216 by means of angularly supported guide pulleys 217 and 218. Since the drive shaft 148 receives its power from the continuously rotating drive shaft 103, the cross conveyor belts 210 are also continuously driven.

Although the entire pinsetting deck 10 is not shown in the drawings, since it forms no part of the present invention, such a deck normally includes pockets adapted to receive an entire set of ten pins adapted to be spotted on the alley for reuse. Similarly, although the entire turret 13 does not appear in the drawings, it too includes pockets adapted to receive an entire set of ten pins. The pins are delivered one by one from the cross conveyor 18 to the pockets in the turret 13 as the turret is indexed to present succeeding pockets to a rewardly disposed position adjacent the discharge end of conveyor 18 for receiving a pin from the conveyor. Normally pins in use with an automatic pinsetter of the type illustrated include two complete sets of ten each. The pin handling mechanism described hereinabove functions continuously to deliver pins from the pit 12 to the cross conveyor 18 as they are removed from the alley 11. A condition may occur in which the turret has been completely filled and the conveyor 18 continues to supply pins for delivery to the turret, for example if an extra pin in excess of the two sets should be in use. Since the turret may not, under these circumstances, be adapted to receive pins from the conveyor 18 because it is filled, an important feature of the present invention encompasses a blocking mechanism associated with the discharge end of the cross conveyor 18 which functions to stop the progress of pins on the conveyor 18 without stopping the conveyor when the turret has been filled. The blocking mechanism also functions to space the delivery of pins from the cross conveyor 18 to the turret in order to permit indexing of the turret between the delivery of pins from the cross conveyor.

The blocking and spacing mechanism, referred to above, includes a blocking lever 225 (Fig. 9) pivotally mounted at its mid-portion on a pin 226 supported in the depending leg portions of the inverted U-shaped frame member 200. The blocking lever 225 includes a rearwardly extending blocking portion 227 adapted in a first position of the lever 225 to permit the passage of pins, and adapted in a second position of the lever 225 to block the passage of pins on the conveyor 18. The lever 225 also includes a portion 228 extending forwardly or toward the discharge end of the conveyor 18 adapted in the first described position of the lever to be engaged by a passing pin to move the lever 225 to a blocking position. The lever 225 is normally biased to a non-blocking position by means of a spring 229 connected to the rearwardly extending portion 227 of the lever and anchored at its other end to the upright arm 204. Means is provided for limiting movement of the lever 225 by the spring 229 to define the non-blocking position of the lever. This means includes an arm 230 pivoted at 231 on the frame member 200 and having a roller 232 adapted for engagement with a recessed portion on an arm 234 extending downwardly from the forwardly extending portion 228 of the lever 225. The arm 230 is biased downwardly by means of a spring 235 connected at one end to the arm 230 and anchored at the other end to the transversely extending supporting bar 205.

The arm 230 and the roller 232 are also adapted to function as a detent device for retaining the blocking lever in the blocking position. Thus, when the belly of a passing pin engages the forwardly extending portion 228 of the lever, the lever is moved to a position in which the blocking portion 227 is raised to prevent the passage of pins on the conveyor 18. Movement of the lever 225 in this fashion moves the downwardly extending arm 234 secured thereto to a position in which the roller 232 may be moved by the spring 235 into engagement with a surface 237 formed at the end of the arm 234. Engagement of the roller 232 with the surface 237 functions to block the return of the lever 225 to its normal position by the spring 229, and thus the lever is retained in the blocking position.

The indexable turret 13 is mounted for rotation about a vertical axis and is formed with a plurality of similarly shaped pin receiving pockets 240 (Fig. 3) arranged about the axis of rotation, each of the pockets being generally vertically disposed and inclined upwardly and toward the axis of rotation, as indicated in Fig. 1, wherein one of the pockets 240 is shown superposed in broken line. The turret also includes an additional pin receiving pocket 241 having a terminal portion 241' disposed between two of the previously described pockets 240 and being inclined from its terminal portion downwardly and toward the axis of rotation, so that a substantial portion of the additional pocket is disposed somewhat centrally among the previously described pockets 240. The first described similar pockets 240 normally would number nine and the additional pocket 241 would receive the tenth pin, completing the set to be received by the turret.

In order to block the passage of pins on the conveyor 18 without stopping the conveyor itself when the turret is filled, the blocking mechanism described above includes a releasing device which is actuated by each of the pins delivered to each of the similar pockets 240 on the turret, but which is unaffected by the pin delivered to the additional pocket 241. The release device, referred to above, includes a pivotally mounted release lever 245 supported at 246 on the discharge end of the frame member 200. A lower portion of the release lever 245 is connected by a linkage system indicated generally by the reference numeral 247, the linkage system being controlled by mechanism associated with the turret to normally maintain the lever 245 in the outward position indicated in full lines. Each of the pins delivered to the similar pockets 240 is directed by virtue of the shaping and location of the pockets 240 against the lever 245 so that the lever is moved to the broken line position wherein an arm 248 extending rearwardly from the lever engages the roller 232 to return the roller to its normal position. Movement of the roller 232 to its normal position disengages it from the surface 237 on the arm 234 so that the blocking lever 225 is released for return to its normal or non-blocking position. Movement of the release lever in the fashion described above is also effective through the medium of the linkage 247 to release the turret 13 for indexing to position a succeeding pocket on the turret to receive the next pin delivered from the cross conveyor. On each indexing of the turret, the linkage system 247 is effective to return the release lever 245 to its normal or outward position. When the last pin of a set is delivered to the turret 13, that is, the pin delivered to the pocket 241, the location, shaping and inclination of the pocket 241 are such that the pin does not strike and actuate the lever 245 to a releasing position. Thus, the blocking lever 225 is not returned to its normal position when the last pin is delivered to the turret 13. The lever, therefore, functions to block succeeding pins on the conveyor 18 until such time as the turret releases the set of pins to the deck 10. When the release of pins by the turret to the deck occurs, the linkage system 247 is effective to actuate the releasing lever 245 to release the blocking lever 225 for return to its normal or non-blocking position, whereupon the device then begins to function again as described above.

Figure 11:
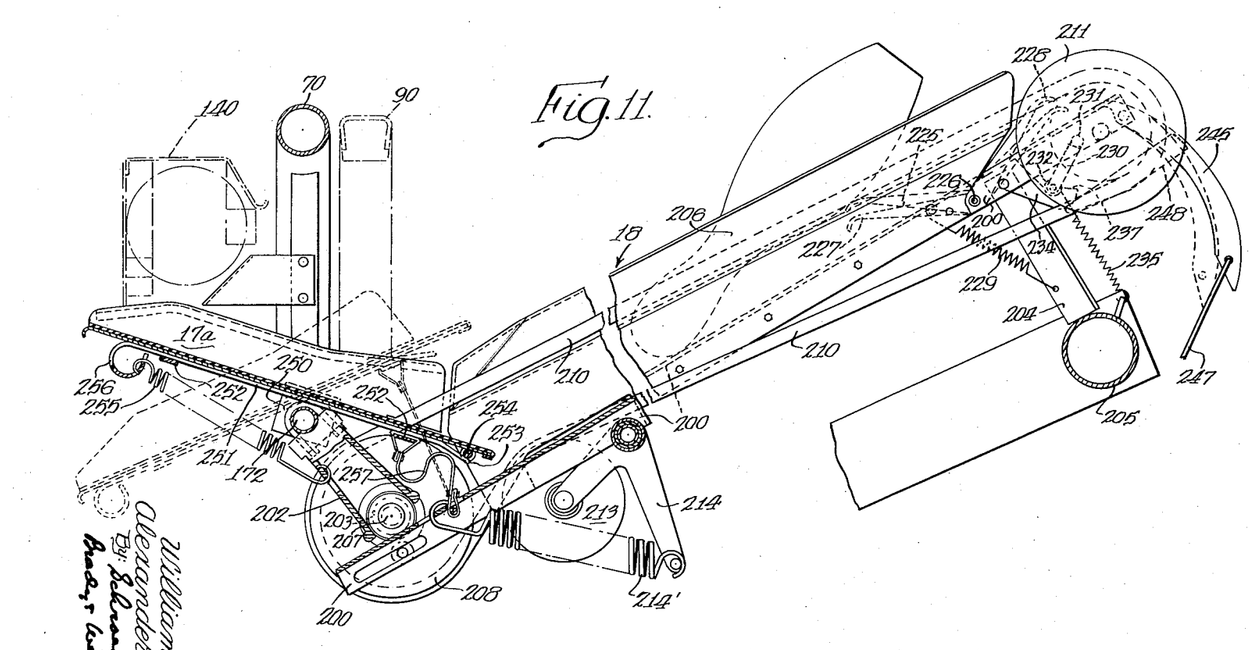
Figure 11 is a view similar to Figure 9, illustrating another embodiment of the pin receiving tray.

Referring to Figure 11, there is illustrated another embodiment of the pin receiving tray which underlies the pin elevating ring at the pin discharge position. Much of the structure illustrated in Figure 11 is similar to that previously described, and the same reference numerals have therefore been used in designating such structure. Like the tray 17 previously described, the pin receiving tray 17a shown in Figure 11 is formed to direct the pins received therein toward the cross conveyor 18 with the base of the pins leading regardless of whether the pin is delivered to the tray with the base or the head leading. The tray 17a is adapted to function as an automatic transfer out device for transferring pins out of use when, for example, it is desired to replace the entire group of pins being used in the pinsetter. To this end the tray 17a is pivotally mounted for movement between a forwardly and downwardly inclined position in which the tray directs pins forwardly toward the cross conveyor 18 for reuse in the pinsetter and a rearwardly and downwardly inclined position wherein the tray will direct the pins rearwardly of the pin elevating ring for transfer out of use.

The tray 17a carries on its underside downwardly extending brackets 250 which are pivotally mounted on the horizontally extending leg 172 of the structural member 170 secured to the circular frame member 70. Means is provided for latching the tray 17a in the forwardly and downwardly inclined position wherein the pins will be directed forwardly for reuse. The latching means includes a latch member 251 slidably mounted on the underside of the pin tray 17a by means of guides 252 which permit slidable movement of the latch member 251 in a front to rear direction. The latch member is formed at the forward end with an angularly bent latching portion 253 engageable with a latch pin 254 which is supported on the cross conveyor 18. The latch member 251 is biased in a forward direction to retain the latch portion 253 in engagement with the pin 254 by means of a spring 255 having one end connected to the latch member 251 and the other end anchored on the yoke 202. The pin receiving tray 17a may be unlatched by manually grasping a handle portion 256 on the latch member and slidably moving the latch member rearwardly to disengage the latching portion from the latch pin 254, whereupon the spring 255 will function to bias the tray to the rearwardly and downwardly inclined position. Movement of the tray toward a rearwardly and downwardly inclined position is limited by means of a flexible strap 257 having the end secured to the forwardly disposed guide 252 and having its other end anchored on the conveyor frame 200. The strap 257 functions to determine the rearwardly and downwardly inclined position of the tray 17.

We claim:

1. A pin handling mechanism for use with an automatic pinsetter mounted on a bowling alley comprising, in combination, a pin elevating member mounted at the rear of the alley pit and movable in a continuous path having an opening therethrough and an upwardly extending portion to elevate pins from a pickup position adjacent the floor of the alley pit to an elevated discharge position, a pin receiving tray adjacent the pin discharge position adapted to receive pins from the elevating member, and means mounting the pin receiving tray for movement between a position in which the tray directs pins forwardly of the pin elevating member for reuse and a position in which the tray directs pins rearwardly through the opening in the path of the pin elevating member.

2. A pin handling mechanism for use with an automatic pinsetter mounted on a bowling alley comprising, in combination, a vertically disposed framework mounted adjacent the rear of the alley pit, a rotatable ring-shaped pin elevating member mounted on said framework and having circumferentially spaced means on its inner periphery to elevate pins from a position adjacent the floor of the alley pit to an elevated discharge position, a pin guiding and supporting member mounted on said framework and shaped generally to correspond to the curvature of the pin elevating member to guide and support pins elevated by the elevating member, said pin guiding and supporting member terminating at a position adjacent the top of said pin elevating member to define the pin discharge position, a pin receiving tray mounted within the periphery of the pin elevating member at the pin discharge position below the terminal portion of said pin guiding and supporting member, means mounting the pin receiving tray on said framework for movement between a forwardly and downwardly inclined position in which it will direct pins forwardly of the pin elevating member and a rearwardly and downwardly inclined position in which it will direct pins rearwardly of the pin elevating member, and means for maintaining the tray in either position.

3. A pin handling mechanism for use with an automatic pinsetter mounted on a bowling alley comprising, in combination, a framework mounted adjacent the rear of the alley pit, a pin elevating member supported on the framework for elevating pins from a pickup position adjacent the floor of the alley pit to an elevated discharge position, a pin receiving tray adjacent the pin discharge position, adapted to receive pins from the elevating member, means mounting the pin receiving tray on said framework for pivotal movement between a forwardly and downwardly inclined position in which it will direct pins forwardly of the pin elevating member for reuse and a rearwardly and downwardly inclined position in which it will direct pins rearwardly of the pin elevating member for transfer out of use, yieldable means operable to maintain the tray in the forwardly and downwardly inclined position, the construction and arrangement of said tray and said yieldable means being such that the tray is pivotable to the rearwardly and downwardly inclined position by a pin whose passage on the tray is blocked, and latching means operable to maintain the tray in the rearwardly and downwardly inclined position.

4. A pin handling mechanism for use with an automatic pinsetter mounted on a bowling alley comprising, in combination, a framework mounted adjacent the rear of the alley pit, a pin elevating member supported on the framework for elevating pins from a pickup position adjacent the floor of the alley pit to an elevated discharge position, a pin receiving tray adjacent the pin discharge position adapted to receive pins from the elevating member, means mounting the pin receiving tray on said framework for pivotal movement between a forwardly and downwardly inclined position in which it will direct pins forwardly of the pin elevating member for reuse and a rearwardly and downwardly inclined position in which it will direct pins rearwardly of the pin elevating member for transfer out of use, a spring having a rear end anchored on the underside of the tray eccentrically of the pivot axis for the tray, a pivoted lever mounted on the underside of the tray forwardly of said pivot axis and having the forward end of said spring connected thereto, said lever having a portion bearing on a stationary part of the framework so that the force of the spring is effective to urge said tray toward the forwardly and downwardly inclined position, stop means for limiting movement of the tray to determine the forwardly and downwardly inclined position, said tray being pivotable to the rearwardly and downwardly inclined position against the bias of said spring, and a latching portion on the end of said pivoted lever engageable with a stationary part of said framework to hold the tray in the rearwardly and downwardly inclined position.

5. A pin conveying means for use with a pinsetter mounted on a bowling alley having a pit at the rear end of the alley provided with means for directing pins to a pickup position, comprising, a framework adjacent the pit, a pin elevating mechanism mounted on the framework to elevate pins from the pickup position adjacent the floor of the alley pit to an elevated pin discharge position, means for continuously driving the pin elevating mechanism, a pin tray mounted on the framework at the pin discharge position to receive pins elevated and discharged by said elevating mechanism and to direct the pins forwardly for reuse, a cross conveyor supported on said framework for conveying pins from the pin receiving tray for reuse in the pinsetter, means operative to continuously drive said conveyor, and pin operated means associated with the discharge end of said conveyor for stopping the progress of pins on the conveyor without stopping the conveyor after the passage of a predetermined number of pins.

6. For use with a pinsetter having a magazine for holding pins for reuse mounted over the rear end of a bowling alley provided with a pit at the rear end of the alley, a pin conveying means for delivering pins from the pit to said magazine comprising, in combination, means in the bottom of the pit for directing pins to a pickup position, a framework adjacent the pit, a pin elevating mechanism mounted on the framework to elevate pins from the pickup position to an elevated pin discharge position, means for continously driving the pin elevating mechanism, a pin tray mounted on the framework at the pin discharge position to receive pins elevated and discharged by said elevating mechanism and to direct the pins forwardly for reuse, a cross conveyor supported on said framework for conveying pins from the pin receiving tray to said magazine for reuse, means operative to continuously drive said conveyor, and pin operated means associated with the discharge end of said conveyor operable when the magazine is filled for stopping the progress of pins on the conveyor without stopping the conveyor.

7. In a pinsetter mounted on a bowling alley having a pit at the rear end of the alley, a framework adjacent the rear of the alley, an indexable pin holding turret mounted on said framework over the rear end of the alley for rotation about a vertical axis and having a plurality of similarly shaped pin receiving pockets arranged about said axis each inclined upwardly and toward said axis and an additional pin receiving pocket having a terminal portion disposed between two of the other pockets and being inclined from the terminal portion downwardly and toward said axis. means in said pit for directing pins rearwardly to a pickup positon, a pin elevating mechanism mounted on the framework to elevate pins from the pickup position to an elevated discharge position, means for receiving pins from said elevating mechanism at the discharge position and for conveying the pins forwardly to said turret including a conveyor terminating in a discharge end adjacent the rearwardly disposed pocket on the turret so that pins from said conveyor will drop into successive pockets on indexing the turret, means for continuously driving the conveyor, and means associated with the discharge end of the conveyor for stopping the progress of pins on the conveyor without stopping the conveyor including a blocking device normally positioned to permit a pin on said conveyor to pass and movable by a passing pin to a blocking position, and means operable by a pin delivered to each of said similar pockets for returning said blocking device to normal position, said last recited means being unaffected by a pin delivered to said additional pocket.

8. In a pinsetter mounted on a bowling alley having a pit at the rear end of the alley, an indexable turret supported over the rear end of the alley for rotation about a vertical axis and having a plurality of similarly shaped pin receiving pockets arranged about said axis each inclined upwardly and toward said axis and an additional pin receiving pocket having a terminal portion disposed between two of the other pockets and being inclined from the terminal portion downwardly and toward said axis, means for delivering pins from the pit to said turret for reuse including a conveyor frame having a conveyor terminating in a discharge end over the rearwardly disposed pocket on the turret so that pins delivered from said conveyor will drop into successive pockets on indexing the turret, means for continuously driving the conveyor, a blocking device associated with the discharge end of the conveyor for stopping the progress of pins on the conveyor including a lever having a midportion pivotally mounted on said conveyor frame, said lever having a rearwardly extending portion adapted in one position of the lever to permit the passage of a pin on the conveyor and in another position to block the passage of a pin on the conveyor, means biasing the lever to normally maintain it in said one position to permit a pin to pass, said lever having a forwardly extending portion disposed for engagement by a passing pin when said lever is in said one position to pivot the lever to blocking position, a detent for holding the lever in blocking position, a release lever pivotally mounted on said conveyor frame for operation by a pin delivered to each of said similar pockets to actuate said detent to free said blocking lever for return to normal position, said release lever being unaffected by a pin delivered to said additional pocket.

9. A pin conveyor for use with a pinsetter adapted to be mounted on a bowling alley, comprising, in combination, a conveyor frame having an elongated conveyor trough of generally U-shaped cross section to define a bottom wall and side walls extending lengthwise of the frame, pulleys mounted on said frame, one adjacent each end of each side wall so that a pair of pulleys is associated with each side wall, each of said pairs of pulleys having a belt trained thereabout so that its upper reach extends lengthwise of the trough on the inside of the adjacent side wall at a position between the top and the bottom of the trough for engagement with the belly of a pin to transport the pin with its head resting on the bottom of the trough, a blocking device associated with the discharge end of said conveyor including a lever having a midportion pivotally mounted on the conveyor frame, said lever having one end portion extending toward the entrance end of the conveyor adapted in one position of the lever to permit the passage of a pin on the conveyor and in another position to block the passage of a pin on the conveyor, means biasing said lever to said one position to normally permit the passage of a pin, said lever having its other end portion extending toward the discharge end of the conveyor and being disposed, when said lever is in said one position, for engagement by a passing pin to pivot the lever to blocking position, a detent mounted on the conveyor frame for holding the lever in blocking position, and means mounted on the conveyor frame operable by said passing pin for actuating said detent to free the blocking lever for return to normal position.

10. A pin handling mechanism for use with a pinsetter mounted on a bowling alley having a pit at the rear end of the alley provided with means for directing pins to a pick-up station, comprising, a pin elevating mechanism for elevating pins from the pick-up station adjacent the floor of the pit to an elevated pin discharge station, means operative to continuously drive the pin elevating mechanism, a pin tray mounted at the pin discharge station in position to receive pins elevated and discharged by said elevating mechanism and to direct the pins forwardly for reuse, a conveyor for conveying pins from the pin tray for reuse in the pinsetter, means operative to continuously drive the conveyor, pin operated means associated with the conveyor for stopping the progress of pins on the conveyor without stopping the conveyor after the passage of a predetermined number of pins, means mounting the pin tray for movement between the first defined position and a second position in which it will direct pins rearwardly for transfer out of use, and yieldable means normally operative to maintain the tray in the first defined position and yieldable to permit movement of the tray to the second position when passage of a pin onto the tray is blocked.

11. A pin handling mechanism for use with a pinsetter mounted on a bowling alley having a pit at the rear end of the alley, comprising, a magazine supported over the rear end of the alley for holding pins for reuse, means in the pit for directing pins to a pick-up station, a pin elevating mechanism for elevating pins from the pick-up station to an elevated pin discharge station, means operative to continuously drive the pin elevating mechanism, a pin tray mounted at the pin discharge station in a forwardly inclined position to receive pins elevated and discharged by said elevating mechanism and to direct the pins forwardly for reuse, a conveyor for conveying pins from the pin receiving tray to said magazine for reuse, means operative to continuously drive said conveyor, pin operated means associated with the discharge end of said conveyor operable when the magazine is filled for stopping the progress of pins on the conveyor without stopping the conveyor, means mounting the pin tray for pivotal movement between the first defined position and a second, rearwardly inclined position in which it will direct pins rearwardly for transfer out of use, yieldable means normally operative to maintain the tray in the first defined position and yieldable to permit movement of the tray to the second position by a pin whose passage onto the tray is blocked, and means mounted adjacent the pin tray for receiving pins from said tray in the second position.

12. In an automatic pinsetter for use with a bowling alley having an alley pit, in combination, a rotatable annular pin elevating member having an opening therethrough and adapted to operate between a pin receiving position adjacent the alley pit and an elevated pin discharge position, and a pin tray positioned adjacent the pin elevating member at the pin discharge position and at least partially disposed within the opening through the pin elevating member for receiving pins from the pin elevating member, said tray including a portion movable between a first position for directing pins forwardly of the pin elevating member for reuse and a second position for directing pins rearwardly through the opening in said pin elevating member for transfer out of use.

13. A pin conveying means for use with a pinsetter mounted on a bowling alley having a pit at the rear end of the alley provided with means for directing pins to a pickup position, comprising, a framework adjacent the pit, a pin elevating mechanism mounted on the framework to elevate pins from a pickup position adjacent the floor of the alley pit to an elevated pin discharge position, means including a conveyor for conveying pins forwardly from the pin discharge position for reuse in the pinsetter, means for continuously driving the conveyor, and means associated with the discharge end of the conveyor for stopping the progress of pins on the conveyor without stopping the conveyor including a blocking device normally positioned to permit a pin on said conveyor to pass, means engageable by said passing pin for moving the blocking device to a blocking position, and pin operable reset means at the discharge end of the conveyor actuatable by said passing pin to cause return of the blocking device to the non-blocking position, thereby to space the delivery of pins singularly from the continuously operating conveyor.

14. A pin conveying means for use with a pinsetter mounted on a bowling alley having a pit at the rear end of the alley provided with means for directing pins to a pickup position, comprising, a framework adjacent the pit, a pin elevating mechanism mounted on the framework to elevate pins from the pickup position adjacent the floor of the alley pit to an elevated pin discharge position, means including a conveyor for conveying pins forwardly from the pin discharge position for reuse in the pinsetter, means for continuously driving the conveyor, and means associated with the discharge end of the conveyor for stopping the progress of pins on the conveyor without stopping the conveyor including a blocking device normally positioned to permit a pin on said conveyor to pass, means engageable by each passing pin for moving said blocking device to a blocking position, pin operable reset means for returning the blocking device to non-blocking position, means for receiving a succession of a predetermined number of pins from the conveyor causing said predetermined number of pins to move in a predetermined path wherein each pin passing from the conveyor to the receiving means actuates the reset means to cause return of the blocking device to non-blocking position, and means for receiving an additional pin in excess of said predetermined number from the conveyor causing said additional pin to move in a path different from said predetermined path, bypassing the reset means and thereby leaving the blocking device in blocking position to stop the progress of pins on the conveyor without stopping the conveyor.

15. A pin conveyor for use with a pinsetter adapted to be mounted on a bowling alley, comprising, in combination, a conveyor frame having an elongated conveyor trough of generally U-shaped cross section defining a bottom wall and side walls extending lengthwise of the frame, pulleys mounted on the frame one adjacent each end of each side wall so that a pair of pulleys is associated with each side wall, each pair of pulleys having a belt of circular cross section trained thereabout so that its upper reach extends lengthwise of the trough on the inside of the adjacent side wall at a position between the top and bottom of the trough for engagement with the belly of a pin to transport the pin with its head resting on the bottom wall of the trough, means operable to continuously drive the pulleys and belts, and pin operated means associated with the discharge end of said conveyor for stopping the progress of pins on the conveyor without stopping the belts after the passage of a predetermined number of pins.

16. A pin handling mechanism for use with an automatic pinsetter mounted on a bowling alley, comprising, in combination, a pin elevator including a rotatable ring shaped pin elevating member for elevating pins from a pickup position adjacent the floor of the alley pit to an elevated discharge position, said pin elevating member having an opening therethrough, a pin tray mounted at the pin discharge position for receiving pins from the elevator, means mounting the pin receiving tray for pivotal movement between a forwardly and downwardly inclined position for directing pins forwardly of the pin elevator for reuse and a rearwardly and downwardly inclined position for directing pins rearwardly through the opening in the pin elevating member for transfer out of use, and means for normally maintaining the tray in the forwardly and downwardly inclined position.

References Cited in the file of this patent

UNITED STATES PATENTS

| | | |
|---|---|---|
| 907,700 | Morenus | Dec. 22, 1908 |
| 923,064 | Morenus | May 26, 1909 |
| 1,573,643 | Proch | Feb. 16, 1926 |
| 1,712,186 | White | May 7, 1929 |
| 2,015,428 | Hedenskoog | Sept. 24, 1935 |
| 2,438,500 | Hertzler | Mar. 30, 1948 |
| 2,588,297 | Scheppe | Mar. 4, 1952 |
| 2,616,694 | Montooth | Nov. 4, 1952 |
| 2,672,341 | Flint | Mar. 16, 1954 |
| 2,711,318 | Schmidt | June 21, 1955 |
| 2,767,983 | Holloway | Oct. 23, 1956 |
| 2,781,195 | Holloway | Feb. 12, 1957 |
| 2,817,529 | Montooth | Dec. 24, 1957 |